(12) United States Patent
Madawala et al.

(10) Patent No.: US 10,270,289 B2
(45) Date of Patent: Apr. 23, 2019

(54) POLYPHASE INDUCTIVE POWER TRANSFER SYSTEM WITH INDIVIDUAL CONTROL OF PHASES

(71) Applicants: Auckland Uniservices Limited, Auckland (NZ); Udaya Kumara Madawala, Flat Bush (NZ); Duleepa Jayanath Thrimawithana, Mt Wellington (NZ)

(72) Inventors: Udaya Kumara Madawala, Flat Bush (NZ); Duleepa Jayanath Thrimawithana, Mt Wellington (NZ)

(73) Assignee: Auckland UniServices Limited, Auckland (NZ)

( * ) Notice: Subject to any disclaimer, the term of this patent is extended or adjusted under 35 U.S.C. 154(b) by 290 days.

(21) Appl. No.: 14/424,384

(22) PCT Filed: Aug. 28, 2013

(86) PCT No.: PCT/NZ2013/000151
§ 371 (c)(1),
(2) Date: Feb. 26, 2015

(87) PCT Pub. No.: WO2014/035260
PCT Pub. Date: Mar. 6, 2014

(65) Prior Publication Data
US 2015/0207335 A1    Jul. 23, 2015

(30) Foreign Application Priority Data
Aug. 28, 2012   (NZ) .................................. 602095

(51) Int. Cl.
*H02J 50/10*   (2016.01)
*H02J 50/40*   (2016.01)
(Continued)

(52) U.S. Cl.
CPC ............ *H02J 50/10* (2016.02); *B60L 11/182* (2013.01); *B60L 11/1842* (2013.01);
(Continued)

(58) Field of Classification Search
CPC .. H02J 5/005; H02J 50/40; H02J 7/025; H02J 17/00; B60L 11/182; B60L 11/1842;
(Continued)

(56) References Cited

U.S. PATENT DOCUMENTS 6,515,878 B1 * 2/2003 Meins ..................... B60L 5/005
                                                         191/10
8,944,226 B2 * 2/2015 Zengerle ................ B60L 5/005
                                                         191/5
(Continued)

FOREIGN PATENT DOCUMENTS

WO   WO-1999/008359     2/1999
WO   WO-2009045847     4/2009
(Continued)

OTHER PUBLICATIONS

"International Application No. PCT/NZ000151, International Search Report and Written Opinion dated Oct. 28, 2013", (Oct. 28, 2013), 9 pgs.
(Continued)

*Primary Examiner* — Hal Kaplan
(74) *Attorney, Agent, or Firm* — Schwegman Lundberg & Woessner, P.A.

(57) ABSTRACT

The present invention provides a polyphase inductive power transfer (IPT) system comprising a primary power supply comprising a plurality of primary conductors, the primary conductors being individually selectively operable to provide or receive a magnetic field for inductive power transfer; and at least one pick-up comprising one or more pick-up conductors, the one or more pick-up conductors each being
(Continued)

individually selectively operable to magnetically couple with a primary conductor to control power transfer between the primary power supply and a load coupled or coupleable with the respective pick-up. The polyphase primary power supply may be used to power a plurality of single-phase pick-ups, one or more polyphase pick-ups, or a combination thereof. Also disclosed are polyphase primary and secondary converters for use in such a system.

21 Claims, 12 Drawing Sheets

(51) Int. Cl.
    *H02J 5/00*      (2016.01)
    *H04B 5/00*      (2006.01)
    *H01F 38/00*     (2006.01)
    *H02J 17/00*     (2006.01)
    *H02J 7/02*      (2016.01)
    *B60L 11/18*     (2006.01)

(52) U.S. Cl.
    CPC .............. *H02J 5/005* (2013.01); *H02J 7/025* (2013.01); *H02J 50/40* (2016.02); *Y02E 60/721* (2013.01); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/163* (2013.01); *Y04S 10/126* (2013.01)

(58) Field of Classification Search
    CPC ........... B60L 11/1829–11/1831; Y02E 60/721; Y02T 10/7005; Y02T 10/7072; Y02T 90/121; Y02T 90/122; Y02T 90/128; Y02T 90/14; Y02T 90/163; Y04S 10/126; H04B 5/0025–5/0093; H01F 38/14; H01F 2038/143–2038/146; A61B 1/00029; A61N 1/3787

USPC .......................................... 307/104; 320/108
See application file for complete search history.

(56) References Cited

U.S. PATENT DOCUMENTS

| | | | |
|---|---|---|---|
| 10,079,090 B2* | 9/2018 | Teggatz | H01F 38/14 |
| 2011/0254379 A1* | 10/2011 | Madawala | H02J 5/005 |
| | | | 307/104 |
| 2012/0217111 A1* | 8/2012 | Boys | H01F 38/14 |
| | | | 191/10 |
| 2013/0207482 A1* | 8/2013 | Madawala | H02M 3/33561 |
| | | | 307/104 |

FOREIGN PATENT DOCUMENTS

| | | |
|---|---|---|
| WO | WO-2010/062198 | 6/2010 |
| WO | WO-2011/016736 A2 | 2/2011 |
| WO | WO-2011/050960 | 5/2011 |
| WO | WO-2012/005607 | 1/2012 |
| WO | WO-2014/035260 | 3/2014 |

OTHER PUBLICATIONS

"International Application No. PCT/NZ2013/000151, PCT Demand filed Jul. 30, 2014", (Jul. 30, 2014), 4 pgs.
"International Application No. PCT/NZ2013/000151, Second Written Opinion of the International Preliminary Examining Authority dated Sep. 2, 2014", (Sep. 2, 2014), 9 pgs.
Madawala, Udaya K., et al., "A Bidirectional Inductive Power Interface for Electric Vehicles in V2G Systems", Industrial Electronics, IEEE Transactions on (vol. 58, Issue: 10), (Feb. 10, 2011), 4789-4796.
"European Application No. 13832921.4, Extended European Seach Report dated Apr. 20, 2016", (Apr. 20, 2016), 7 pgs.

* cited by examiner

--PRIOR ART--

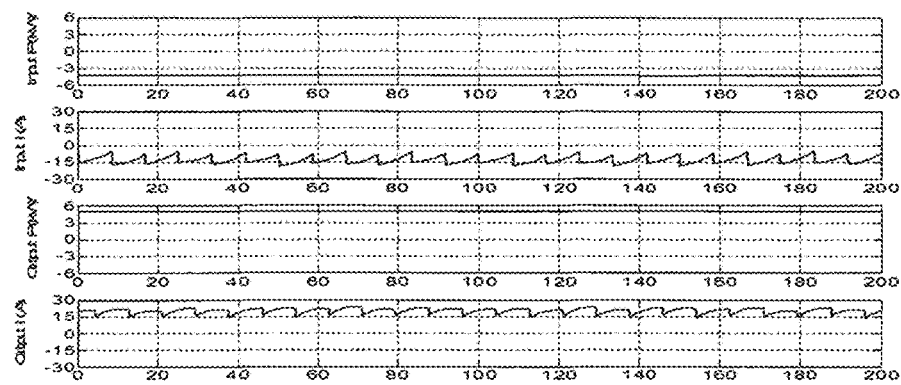
Fig. 13
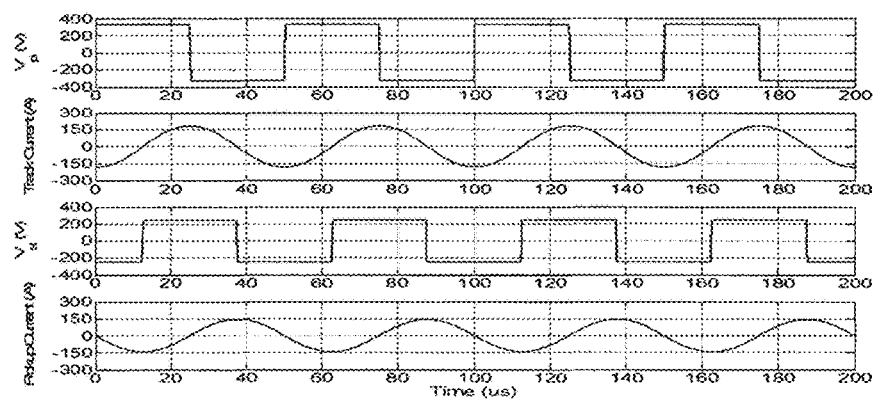
Fig. 14 --PRIOR ART--
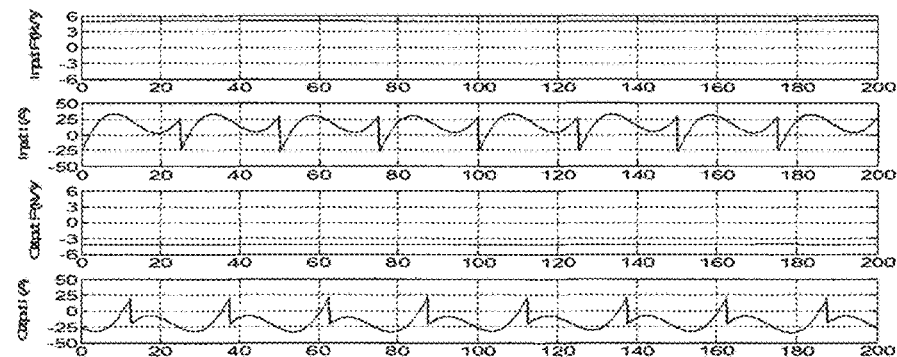
Fig. 15 --PRIOR ART--

POLYPHASE INDUCTIVE POWER TRANSFER SYSTEM WITH INDIVIDUAL CONTROL OF PHASES

PRIORITY CLAIM TO RELATED APPLICATIONS

This application is a U.S. national stage application filed under 35 U.S.C. §371 from International Application Serial No. PCT/NZ2013/000151, which was filed Aug. 28, 2013, and published as WO 2014/035260 on Mar. 6, 2014, and which claims priority to New Zealand Application No. 602095, filed Aug. 28, 2012, which applications and publication are incorporated by reference as if reproduced herein and made a part hereof in their entirety, and the benefit of priority of each of which is claimed herein.

FIELD OF THE INVENTION

This invention relates to both uni- and bi-directional Inductive Power Transfer (IPT) systems, and in particular IPT systems with a polyphase windings on either or both of the primary and secondary sides.

BACKGROUND

At present, consumer demands are focused more on safety, reliability, convenience, efficiency and state of the art of technology and not solely on the cost. Consequently, many new technologies are being implemented to meet such attributes of various applications. Green products or electronics can be considered as an ideal example, and they are intended to curtail the adverse effects of carbon footprint, over use of fossil fuels and associated environmental pollution, etc.

Within a very short time period, many green energy regulations have been introduced and billions of dollars have been invested worldwide in green energy related research and development projects in search for efficient, cost-effective, and reliable green technologies. Amongst these green energy technologies, distributed energy generation (DG) using renewable energy sources, is regarded as one of the best solutions for meeting energy requirements while minimizing the carbon footprint. However, the optimal and efficient use of DG systems, especially in units based on wind and solar power, are largely affected by the stochastic nature of their energy production. Consequently, large and expensive storage systems are required to alleviate such fluctuations and meet the demand in the most efficient way. As a cost-effective alternative storage system, the vehicle to grid (V2G) concept, which uses electric vehicles (EV) to store and supply energy to the grid, is gaining more and more popularity as the vehicle has now become an indispensable component in both "living and mobility".

Traditionally, EVs are charged through a wired connection between the utility grid and the vehicle. However, recent advancements in contactless inductive power transfer (IPT) techniques have made contactless charging of EVs an economically viable solution. Although contactless charging of EVs is still expensive in comparison to wired charging, it offers advantages in relation to reliability, safety and convenience. Thus, contactless charging of electric vehicles is becoming popular as an effective and efficient means of charging EVs.

Existing single-phase bi-directional and uni-directional IPT systems (such as those disclosed in WO 2010/062198) can be used to charge and/or discharge multiple EVs using one IPT primary power source. However, such prior art systems are incapable of energising individual primary (charging) pads/windings/coils/couplers, which are connected in series and powered by one primary supply, and magnetically coupled to pick-up pads (windings/coils) of multiple EVs, to allow for selective charging and/or discharging EVs as required. The selective charging of EVs can be achieved by using a dedicated IPT system, comprising a primary power supply and a primary charging pad which is magnetically coupled to a pick-up pad, for each EV but this is expensive as multiple systems are required for charging multiple EVs. In contrast, the capability of selective charging/discharging of multiple EVs using a single IPT primary power supply is cost effective, and improves efficiency, reliability and safety as each primary pad is energised only when a corresponding EV is to be charged or discharged. Applications that benefit from this capability include charging bays located in public areas, for EVs and dynamic charging/discharging of moving EVs.

Alternatively, efficiency in wireless charging of EVs and similar loads may be improved by employing a poly-phase IPT system. However, existing three-phase IPT systems generally utilise a three-phase primary system but only a single-phase pick-up system with a single pad, and/or suffer from one or more of the disadvantages of limited (if any) or sub-optimal control, flexibility, versatility and overall efficiency.

OBJECT OF THE INVENTION

It is an object of the present invention to at least ameliorate one or more of the disadvantages of the prior art, or to at least provide the public with a useful alternative.

SUMMARY OF THE INVENTION

In a first aspect, the present invention may broadly be said to consist in a polyphase inductive power transfer (IPT) system comprising:
  a primary power supply comprising a plurality of primary conductors, the primary conductors being individually selectively operable to provide or receive a magnetic field for inductive power transfer; and
  at least one pick-up comprising one or more pick-up conductors, the one or more pick-up conductors each being individually selectively operable to magnetically couple with a primary conductor to control power transfer between the primary power supply and a load coupled or coupleable with the respective pick-up.

Preferably any one or more of the plurality of primary conductors are selectively operable to provide a magnetic field as required.

Preferably each of the plurality of primary conductors is operated only when a load is to be powered by a pick-up magnetically coupled with the respective primary conductor.

Preferably the primary conductors are each operated out of phase by 360°/n, where n is the number of primary conductors.

Alternatively, the primary conductors are each operated out of phase by 360°/n, where n is the number of operating primary conductors.

Preferably each of the primary conductors are individually selectively coupled to a power source to control an alternating current in the respective primary conductor.

Preferably the primary power supply further comprises a plurality of switch pairs each selectively coupling a power source to at least one primary conductor whereby each primary conductor is coupled to the power source by a pair of switch pairs, and the switch pairs are independently controlled to control an alternating current in each of the primary conductors.

Preferably the alternating current in each of the primary conductors is controlled by controlling the phase angle between the respective pair of switch pairs coupled therewith. However, any other means for controlling the alternating current may alternatively be used without departing from the scope of the invention.

Preferably the system is bi-directional and power may be selectively transferred from the primary power supply to the at least one pick-up or vice versa.

Preferably power transfer between the primary power supply and a respective pick-up is controlled by controlling the phase angle of an alternating current in the pick-up conductor with respect to an alternating current in the respective primary conductor.

Alternatively, the phase angle between respective alternating currents in the primary and pick-up conductors may be regulated at ±90° and power transfer between the power source and the load is controlled by controlling the magnitude of the alternating currents in the primary and/or pick-up conductors.

Preferably the IPT system comprises a pick-up comprising a plurality of pick-up conductors each magnetically coupled or coupleable with one of the plurality of primary conductors to receive polyphase power from the primary power supply. The system may alternatively comprise a plurality of such polyphase pick-ups.

Preferably the pick-up further comprises a plurality of switch pairs each selectively coupling a load to at least one pick-up conductor whereby each pick-up conductor is coupled to the load by a pair of switch pairs, and the switch pairs are independently controlled to control power transfer between each of the pick-up conductors and the load.

Preferably the power transfer between each of the pick-up conductors and the load is controlled by controlling the phase angle between the respective pair of switch pairs coupled therewith.

Preferably the pick-up comprises a plurality of pick-up conductors equal in number to the plurality of primary conductors.

Alternatively, the IPT system may comprise one or more pick-ups each comprising a single pick-up conductor magnetically coupled or coupleable with any one of the plurality of primary conductors.

Preferably the primary power supply automatically adapts to inductively power both:
one or more pick-ups comprising a plurality of pick-up conductors; and/or
one or more pick-ups each comprising a single pick-up conductor.

In a second aspect, the invention may broadly be said to consist in a polyphase inductive power transfer (IPT) converter comprising a plurality of conductors individually selectively operable to provide or receive a magnetic field for inductive power transfer.

Preferably the conductors are each operated out of phase by 360°/n, where n is the number of conductors.

Alternatively, the conductors are each operated out of phase by 360°/n, where n is the number of operating conductors.

Preferably the IPT converter further comprises a plurality of switch pairs each individually selectively coupling at least one conductor to a power source/sink, wherein each conductor is coupled to the power source/sink by a pair of switch pairs, and the switch pairs are independently controllable to control an alternating current in each of the conductors.

Preferably the alternating current in each of the conductors is controlled by controlling the phase angle between the respective pair of switch pairs coupled therewith.

Preferably the plurality of switch pairs comprises a switch pair common to each of the plurality of conductors, and a plurality of further switch pairs each coupled to one of the plurality of conductors and controlled independently with respect to the common switch pair to control the current in the corresponding conductor.

Preferably the plurality of switch pairs each couple two conductors to the power source, and the switch pairs are operated in an interleaved fashion with a phase lag therebetween.

Preferably each of the plurality of conductors is operated only when inductively coupled with an IPT device in use. The IPT device may comprise an IPT power supply or an IPT pick-up.

Preferably the IPT converter comprises three conductors and three switch pairs, the conductors each being coupled together in a delta or star configuration.

Preferably energisation of each of the conductors can be controlled independently of the others.

Preferably a current and/or voltage in each of the conductors can be individually controlled.

Preferably one or more of the conductors can be energised while one or more other conductors remains un-energised.

Preferably the conductors each comprise part of an LCL compensation network.

Preferably any one or more of the plurality of conductors may be energised simultaneously.

Preferably a number and combination of conductors energised simultaneously is selected based upon a number of pick-up conductors inductively coupled with an IPT device in use.

Preferably the converter comprises one of an IPT power supply or an IPT pick-up.

In a third aspect the invention broadly provides a polyphase IPT primary power converter having:
a first and a second primary conductor means, each primary conductor means being capable of providing a magnetic field upon energisation from a power supply;
a first switch means operatively connected to both the first and second primary conductor means;
a second switch means operatively connected to the first primary conductor means; and
a third switch means operatively connected to the second primary conductor means; whereby the first and second primary conductor means may be energised independently of each other.

Preferably the first primary conductor means is energised by control of the first and second switch means.

Preferably, the second primary conductor means can be selectively energised by control of the first and third switch means.

Preferably the first and second primary conductor means can be energised simultaneously.

Preferably the level of energisation of one of the first and second primary conductor means can be controlled independently of the other.

Preferably each switch means comprises two control switching elements.

Preferably the primary conductor means comprises a primary conductor winding or track.

Preferably the primary conductor means further includes a compensation network.

Preferably the first primary conductor means can be energised while the second conductor means remains un-energised. Preferably the second primary conductor means may be energised while the first primary conductor means remains un-energised.

Preferably the current and/or voltage in each of the first and/or second primary conductor means can be individually controlled.

In a fourth aspect the invention broadly provides an IPT system primary converter having:
- a plurality of primary conductor means each capable of individually providing a magnetic field upon energisation from a power supply;
- a plurality of switch means operatively connected to selected primary conductor means;
- a control means to control the switch means whereby the switch means energise each primary conductor means such that each switching means is operated by a predetermined phase delay with respect to the primary conductor means last energised.

Preferably the arrangement results in currents being produced in the primary conductor means which are phase adjusted with respect to each other.

Preferably there is equal sharing of load current between the plurality of primary conductor means.

In a fifth aspect the invention broadly provides an IPT secondary converter which includes a plurality of pick-up windings for use with the primary IPT converter in either one of the preceding aspects set forth above.

Preferably the converter includes switch means which are operated to allow the pick-up to receive current from each pick-up winding whereby each switching means is operated by a predetermined phase delay with respect to the primary conductor means last energised so as to control power flow from the primary converter to the secondary convertor.

In a sixth aspect, the invention broadly consists of a polyphase IPT system comprising polyphase primary and polyphase pick-ups, where the primary and/or each pick-up has:
- a polyphase converter;
- a polyphase conductive path, coil, or pad (referred to herein as a primary or pick-up windings) electrically coupled to the polyphase converter; and
- a polyphase compensation network.

Preferably the primary and each pick-up are controlled through their own dedicated controller.

Preferably the power flow in each individual pick-up can be controlled by controlling the relative phase angle and/or the magnitude of the voltage generated by the pick-up converter with respect to the phase and/or the magnitude of the current in the primary windings that are coupled with the pick-up windings.

Preferably the primary polyphase windings are magnetically coupled with the polyphase pick-up windings.

Preferably a control mechanism is used to control the bi-directional or uni-directional power flow.

Preferably phase detection means are provided to detect the phase relationship between the polyphase converter of the primary and the converter of each pick-up.

In a seventh aspect, the invention may broadly be said to consist in an inductive power transfer (IPT) power supply comprising a plurality of primary conductors, the primary conductors being individually selectively operable to provide or receive a magnetic field for inductive power transfer, wherein the power supply automatically adapts to supply power inductively to a single pick-up comprising a plurality of pick-up conductors and one or more pick-ups each comprising a single pick-up conductor. That is, pick-ups having either a single pick-up conductor or a plurality of pick-up conductors may be used with the same power supply.

In an eighth aspect, the invention may broadly be said to consist in an inductive power transfer (IPT) power supply comprising a plurality of primary conductors, the primary conductors being individually selectively operable to provide a magnetic field for inductive power transfer to one or more pick-ups each comprising at least one pick-up conductor, wherein the primary conductors are operated out of phase and the number of phases is selected on the basis of a number of pick-up conductors inductively coupled with the primary conductors in use.

Preferably, the number of pick-up conductors inductively coupled with the primary conductors corresponds with a number of pick-up conductors being used to charge a load, and more particularly an electric vehicle.

Further aspects of the invention will become apparent from the following description.

DRAWING DESCRIPTION

One or more embodiments of the invention will now be described with reference to the drawings, in which.

Figure 12:
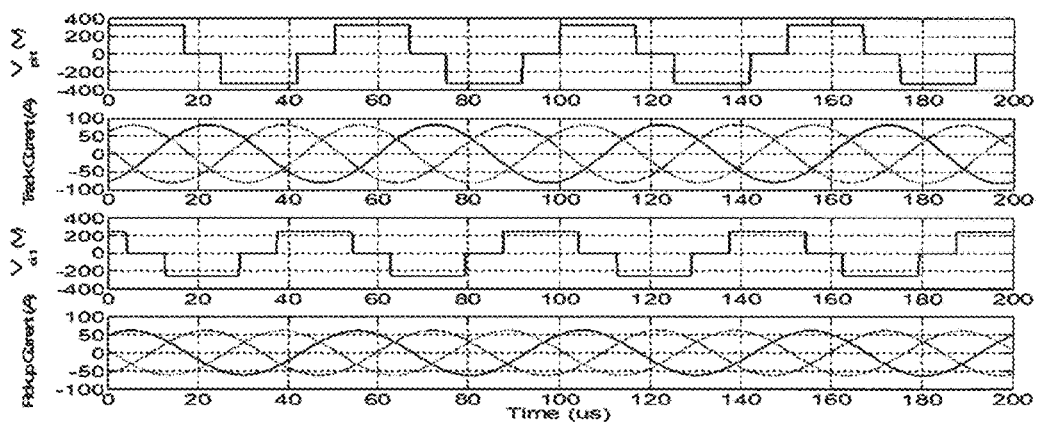

FIGS. 12 and 13 show the power and ripple currents for an example of the present invention, with a 90° lagging phase difference between primary and secondary coil currents; and FIGS. 14 and 15 show the primary and pick-up voltages of a single-phase system of the prior art when delivering 5 kW to a load.

DESCRIPTION OF ONE OR MORE EMBODIMENTS

This document proposes a new polyphase IPT converter which is efficient and has many advantages over existing systems in medium- to high-power contactless power transfer applications. The proposed system, which can deliver either uni- or bi-directional power, is ideal for selective charging/discharging of individual EVs, but not limited thereto.

Figure 1:
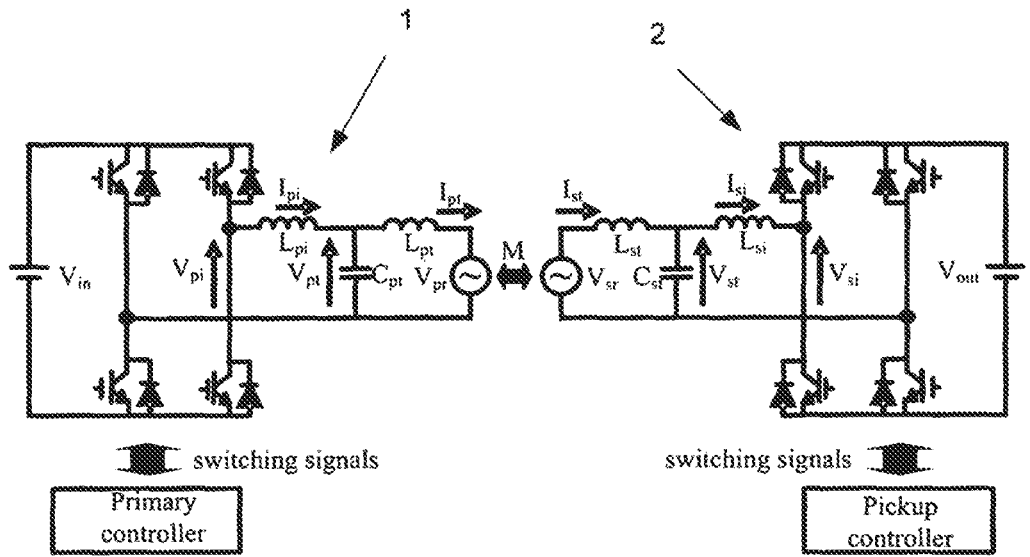
FIG. 1 is a diagram of a single-phase bi-directional IPT system of the prior art, where $V_{in}$ can be derived from a utility supply or battery while $V_O$ represents passive or active load or the battery of EV.

A typical single-phase bi-directional IPT system of the prior art is schematically shown in FIG. 1. As in the case of typical uni-directional IPT systems, a primary supply 1 generates from a power source $V_{in}$ a track current in a primary conductive path or track $L_{pt}$, which is magnetically coupled to the secondary or pick-up winding $L_{st}$. The output of the pick-up circuit 2 can be connected to an electric vehicle or other active/passive load, which is represented by a DC supply $V_{out}$ in FIG. 1 for simplicity. The primary and pick-up circuits are implemented with virtually identical electronics, which include a full-bridge converter and a tuned inductor-capacitor-inductor (LCL) circuit, to facilitate bi-directional power flow between the primary supply and the vehicle (or pick-up). Each LCL circuit is tuned to the track frequency generated by the primary supply, and each full-bridge converter is operated at the same track frequency either in the inverting or rectifying mode, depending on the direction of the power flow. Voltages and the phase angle between the primary and pick-up full-bridge converters will determine the amount and direction of power flow, as described in published International Patent Application WO 2010/062198, the disclosure of which is incorporated herein by reference.

Figure 2:
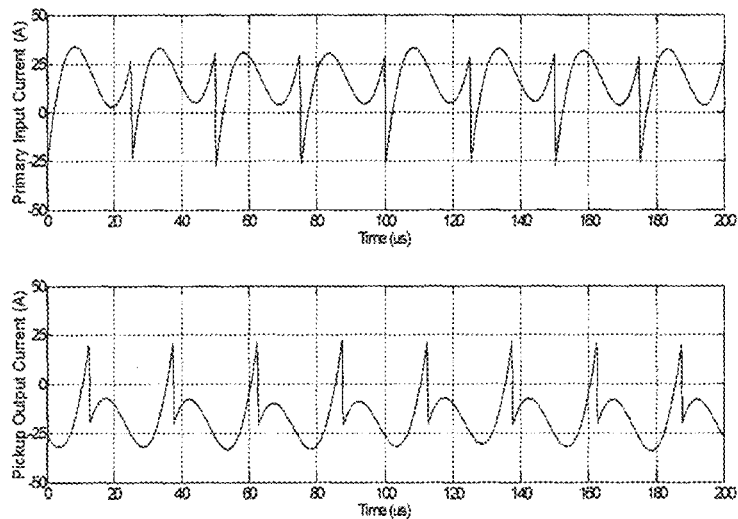
FIG. 2 shows plots of input and output current ripple, respectively, of a single-phase bi-directional IPT system such as that shown in FIG. 1.

A comprehensive analysis on single-phase bi-directional IPT systems together with simulation and experimental results are presented in WO 2010/062198. The input and output currents of a 5 kW single-phase bi-directional IPT system, when it is supplying 5 kW to the output, are shown in FIG. 2. As evident, both input and output ripple currents of this system are significant, impacting upon the power throughput capabilities of the bi-directional IPT system. The high ripple current significantly elevates the losses in the system and may contribute to the deterioration of the battery life of the EV. Furthermore, when such a system is used to supply multiple EVs through separate primary windings, all the primary windings are energised simultaneously, even though some may be un-used. The energisation of un-used windings increases standby losses. In addition, the primary winding currents of such a system will be significantly larger, requiring expensive and bulky track inductors and reducing system efficiency further.

As an alternative solution, the present invention in at least one embodiment provides a polyphase IPT system that produces significantly lower input and output ripple current, and is very well suited to medium-high power uni- or bi-directional IPT applications with multiple pick-ups (EVs or loads). The proposed system includes an efficient mechanism to control the current/voltage of individual primary pads/windings of a bi-directional/uni-directional IPT primary converter which is electrically connected to multiple of primary pads/windings. Examples include charging/discharging of EVs at a public charging bay and dynamic charging of moving EVs, which can only be realized at present by using multiple full-bridge primary converters, one dedicated to each primary winding or EV. This requires a large number of high-voltage switches, adding significantly to the cost of such a system. Furthermore, the proposed new polyphase IPT system allows for a layout with improved magnetic coupling between the primary and the pick-up windings as well as improved spatial or lateral tolerance. With relatively high magnetic coupling, the new system can operate at lower track currents without compromising the power throughput, which further improves the overall efficiency.

First Example: a System to Control Multiple IPT Primary Windings

Figure 3A:
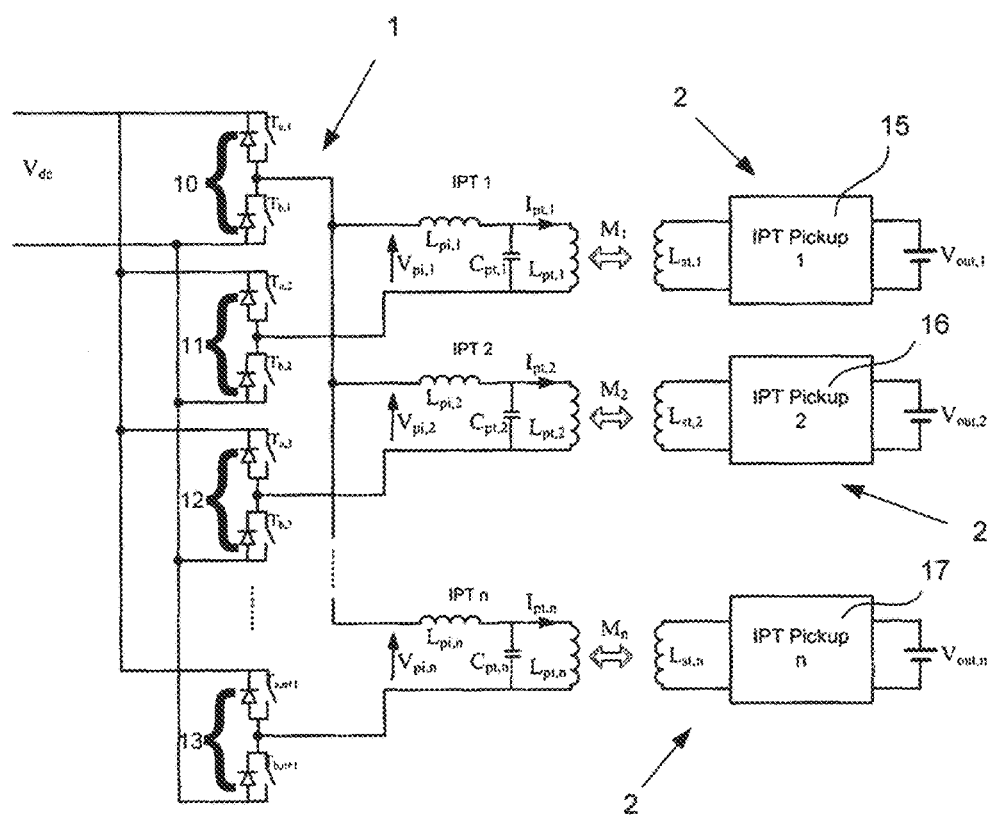
FIG. 3(a) shows a polyphase primary IPT converter, operated in the synchronized mode to supply power to multiple single-phase pick-up IPT converters according to the one embodiment of the invention.
Figure 3B:
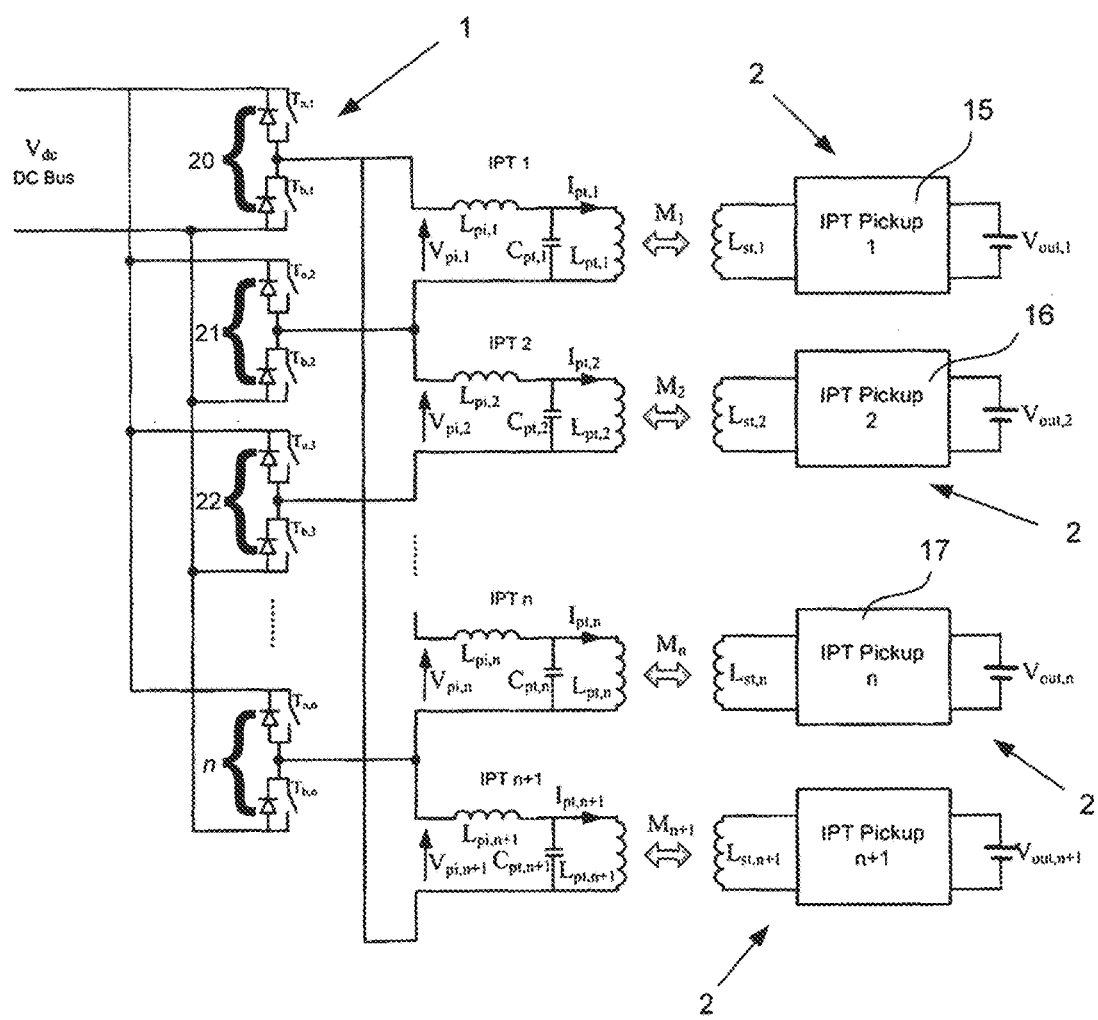
FIG. 3(b) shows a polyphase primary IPT converter, operated in the interleaved mode to supply power to multiple single-phase pick-up IPT converters according to another embodiment of the invention.

As a first example, FIGS. 3(a) and 3(b) show IPT systems according to two similar embodiments of the present invention. The IPT system shown in FIG. 3(a) consists of a primary power supply made from n+1 switch pairs in the form of half-bridge legs (referenced 10, 11, 12 . . . n) and n primary windings ($L_{pt,1}$-$L_{pt,n}$) which are each compensated using LCL compensation networks (comprising inductors $L_{pi,1}$-$L_{pi,n}$, capacitors $C_{pt,1}$-$C_{pt,n}$, and the primary windings $L_{pt,1}$-$L_{pt,n}$). Each of these primary windings can be magnetically coupled with a single pick-up 2 each having a single pick-up winding ($L_{st,1}$-$L_{st,n}$). Each of the pick-up windings, in this example, is controlled by its own controller (15-17), which can either be a bi-directional or a uni-directional controller, and supplies power to its own load. For convenience, no specific load is shown. Instead, the load is represented by a DC supply ($V_{out,1}$-$V_{out,n}$). The first leg 10 of the primary converter in this embodiment is common to all primary windings $L_{pt,1}$-$L_{pt,n}$) and thus is capable of handling the full rated current. The remaining legs of the primary converter (11,12 . . . n) are controlled independently with respect to the first leg 10 to control the current in the corresponding primary windings by selectively coupling the respective windings with the power source $V_{dc}$. For example, the current in $L_{pt2}$ primary winding can be controlled by controlling the half-bridge leg 12 formed by $T_{a,3}$ and $T_{b,3}$ with respect to the first leg 10 formed by switches $T_{a,1}$ and $T_{b,1}$. Switches $T_{a,1}$, $T_{b,1}$, $T_{a,3}$ and $T_{b,3}$ can be controlled using pulse width modulation (PWM) to control the voltage $V_{pi,2}$ in order to maintain a desirable current in the primary winding $L_{pi,2}$. However, phase control is preferred to minimize switching losses and/or peak currents of the system, and is implemented by delaying the square-wave voltage generated by switches $T_{a,3}$ and $T_{b,3}$ in time, with respect to the square-wave voltage generated by switches $T_{a,1}$ and $T_{b,1}$. A phase angle of 0° corresponds to a short-circuit across $V_{pi}$ whereas a phase angle of 180° corresponds to applying maximum $V_{pi}$. Similarly the phase between the half-bridge legs 10 and n formed by $T_{a,1}$, $T_{b,1}$ and $T_{a,n+1}$, $T_{b,n+1}$ can be controlled to regulate the current in the $n^{th}$ primary winding $L_{pt,n}$. Therefore, the topology shown in FIG. 3(a) facilitates full individual and independent control of the currents in each primary winding of an IPT system that employs multiple windings, without the need for a dedicated full-bridge inverter for each primary winding. This allows un-used primary windings to remain un-energised. It also allows individual control of the power made available to each primary winding.

To minimise the peak currents in the system, each of the primary windings are preferably driven out of phase with respect to each other. In particular, each consecutive primary winding is preferably driven out of phase by 360°/n.

The primary power supply of the present invention may be further adapted to automatically detect the presence of a pick-up substantially aligned with each of the primary windings, and/or whether a load supplied by the pick-up requires charging (or discharging), so that each of the plurality of primary windings is energised only when a load is to be powered by a pick-up magnetically coupled with the respective primary winding. This may be by way of sensing a reflected load in the respective primary winding or by wireless communication, for example.

When one or more of the primary windings are inactive (i.e. remaining un-energised), the primary power supply may reconfigure the phase angles between the currents in each of the primary windings. For example, in a primary power supply with three primary windings active, the phase angle would normally be 120° (360°/n). However, if one primary winding is inactive, the remaining two primary windings may be operated 180° out of phase with each other (i.e. 360°/n, where n is the number of active or energised windings).

Any one or more of the primary windings may therefore be selectively energised by the power supply in any combination to power one or more pick-ups, with the energised windings preferably driven out of phase by 360°/n (where n is the number of energised windings) to minimise peak currents. For example, if two primary windings are energised, the selected windings are preferably driven 180° out of phase with respect to each other; if three primary windings are energised, the selected windings are preferably driven 120° out of phase.

An alternative implementation of the present invention is shown in FIG. 3(b). This converter consists of a primary power supply made from n legs (20-n) and n primary windings ($L_{pt,1}$-$L_{pt,n}$) which are compensated using LCL networks (inductors $L_{pi,1}$-$L_{pi,n}$, capacitors $C_{pt,1}$-$C_{pt,n}$ and primary windings $L_{pt,1}$-$L_{pt,n}$). Each of these primary windings can be magnetically or inductively coupled with a pick-up 2, each comprising a single pick-up winding ($L_{st,1}$-$L_{st,n}$). Each of the pick-up windings in this example is controlled by its own controller (e.g. 15, 16, 17), which can either be a bi-directional or a uni-directional controller and supplies power to its own load (represented by $V_{out,1}$-$V_{out,n+1}$). The switch pairs in the form of half-bridge legs 20-n in this primary supply can be operated in an interleaved fashion, wherein each leg (20, 21, 22 . . . n) is operated with a phase lag of 360°/n with respect to the one above it (and coupled to the same primary winding). For example, if there were only three legs 20-22, then leg 21 can be operated with a phase lag of 120° behind leg 20. The resulting primary winding currents thus will be shifted in phase with respect to each other. This mode of operation allows the primary converter to operate with a significantly smaller input ripple current and equal sharing of load current between the legs. However, since a half-bridge leg is shared between two primary windings, the current in each primary winding would be affected by the voltages produced by its neighbouring half-bridge legs. As such, although this method allows for individual control of the currents in separate primary windings, the controllability of these currents is somewhat limited in comparison to the topology shown in FIG. 3(a). For example, primary windings can be energised as pairs, but not individually.

Second Example: Polyphase Primary and Secondary

Figure 4A:
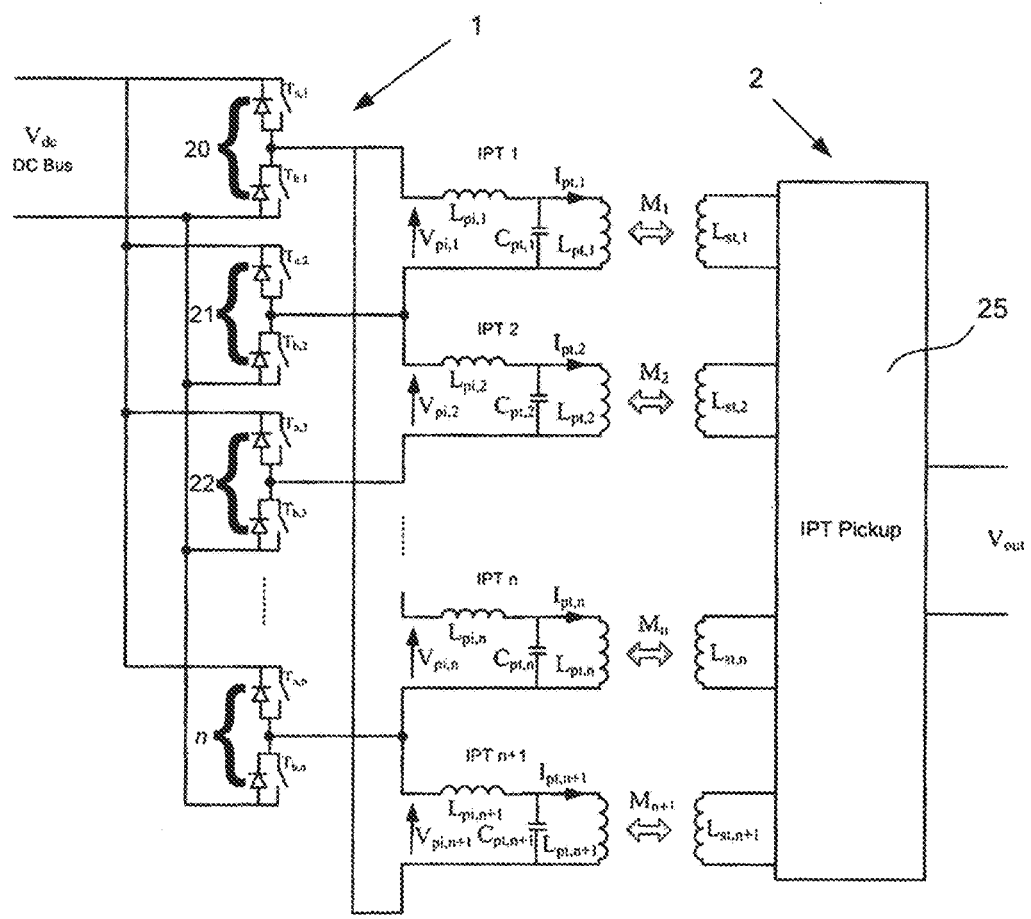
FIG. 4(a) shows a polyphase primary IPT converter supplying power to a polyphase pick-up IPT converter according to another embodiment of the invention.

As a second example, a multiple winding primary may alternatively be coupled to a pick-up having multiple pick-up windings as shown in FIG. 4(a). FIG. 4(a) shows a system with multiple primary windings as described above with reference to FIG. 3(b). These are inductively coupled with a single pick-up having multiple pick-up windings ($L_{st,1}$-$L_{st,n+1}$), which are controlled by a single polyphase converter 25. Such a system may be used to charge a single vehicle such as a bus having multiple secondary or pick-up coils, for example. The present invention in such an application improves the power handling capacity of the IPT system, while minimizing losses. The n primary windings are powered using n half-bridge legs in the primary converter, which are operated in an interleaved fashion as described above with reference to FIG. 3(b). The pick-up converter 25 can be identical to the primary converter. Alternatively, the primary and/or pick-up converters may take the form of the primary converter described above with respect to FIG. 3(a), wherein un-used primary/pick-up windings can remain un-energised.

The n number of half-bridge legs in the pick-up converter are preferably driven with a leading or lagging phase angle with respect to the corresponding leg in the primary side to control the power flow between the primary and the pick-up. The operation of such a system with three primary and three pick-up windings is discussed in detail in the following example.

Figure 4B:
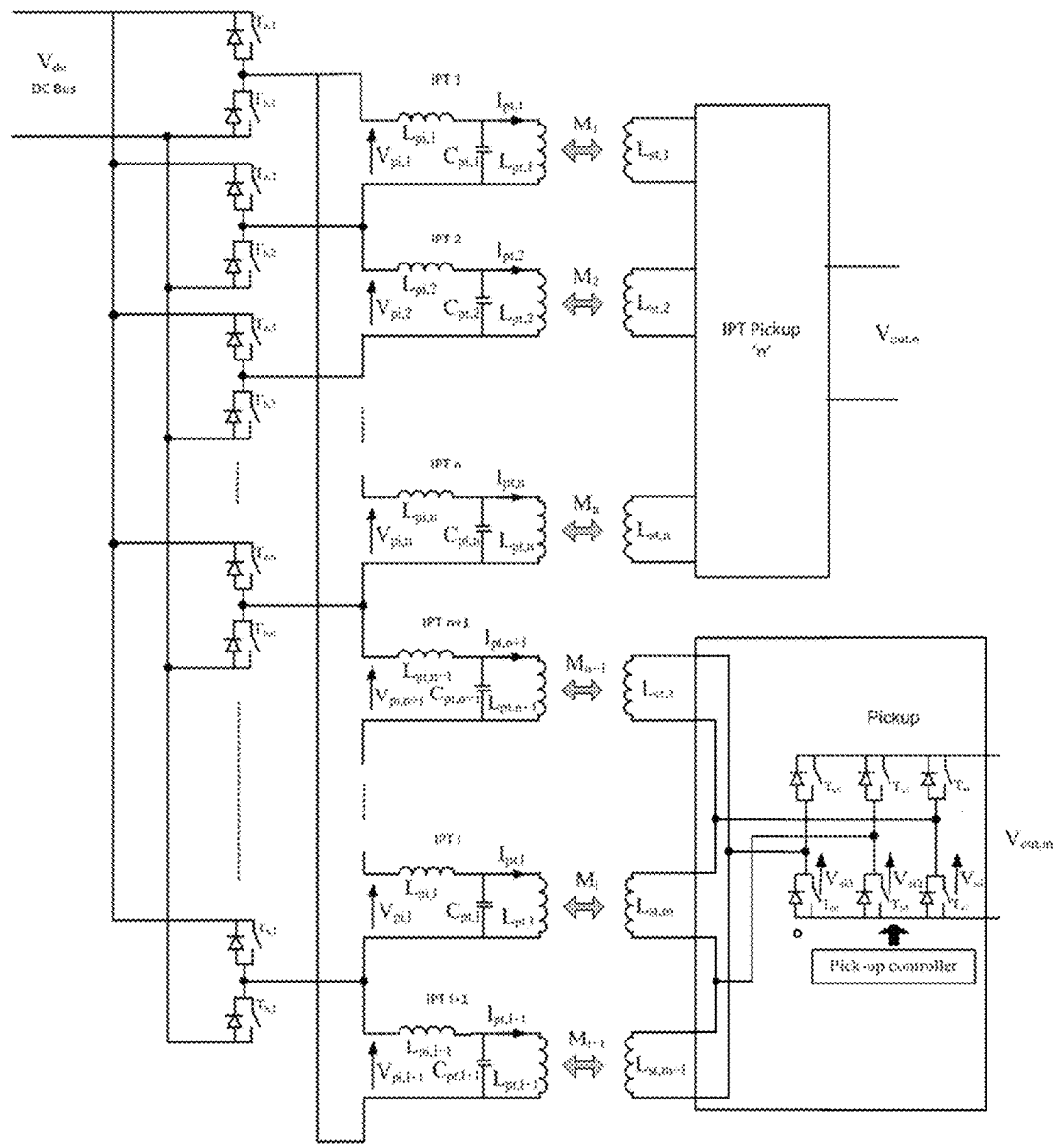
FIG. 4(b) shows a polyphase primary IPT converter supplying power to two polyphase pick-up IPT converters according to yet another embodiment of the invention.

Although FIG. 4(a) shows a single polyphase primary coupled with a single polyphase pick-up, IPT systems according to the present invention may alternatively comprise a poly-phase primary inductively coupled or coupleable with a plurality of poly-phase pick-ups as shown by way of example in FIG. 4(b). While not shown in the drawings, the polyphase primary may also be adapted for inductive coupling with a combination of single-phase and polyphase pick-ups.

Third Example: Three-Phase Bi-Directional IPT System

As a third example, a mathematical analysis together with simulation results of a three-phase IPT system with a single three-phase pick-up are presented to show that both the magnitude and direction of power flow can simply be controlled through either relative phase or magnitude modulation of the voltages generated by the three-phase converters. The performance of the proposed three-phase IPT system is compared with a conventional single-phase IPT system, and results show that the present invention is superior in performance and is particularly attractive for contactless, bi-directional and rapid charging/discharging applications. Although the example referred to in the description below relates to a three-phase IPT system, those skilled in the art will appreciate that the invention is generally applicable to polyphase IPT systems, i.e. systems having more than three-phases. Also, the system may be configured and/or used as either a uni-directional or a bi-directional system.

Figure 5:
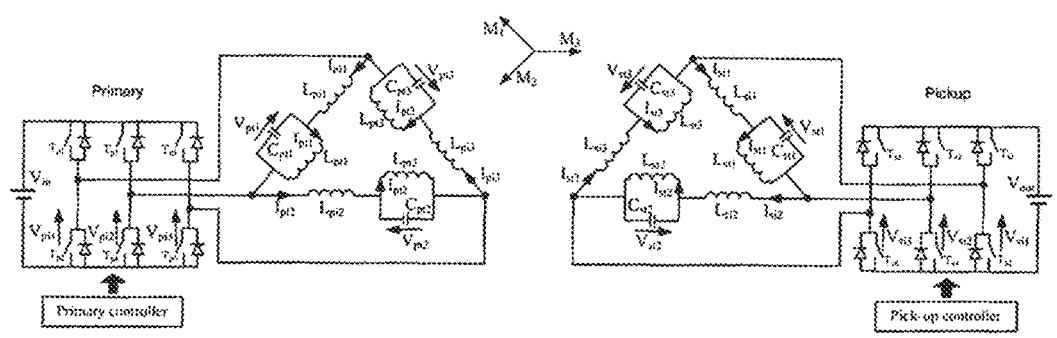
FIG. 5 shows a topology of a three-phase bi-directional IPT system according to another embodiment of the invention.

A three-phase IPT system according to one embodiment of the invention is schematically shown in FIG. 5. In contrast to prior art three-phase IPT systems, which consist of only a three-phase track and a single-phase pick-up, this topology employs a three-phase track as well as a three-phase pick-up system and allows for uni- or bi-directional power transfer between the primary and the pick-up at a higher efficiency.

Figure 6A:
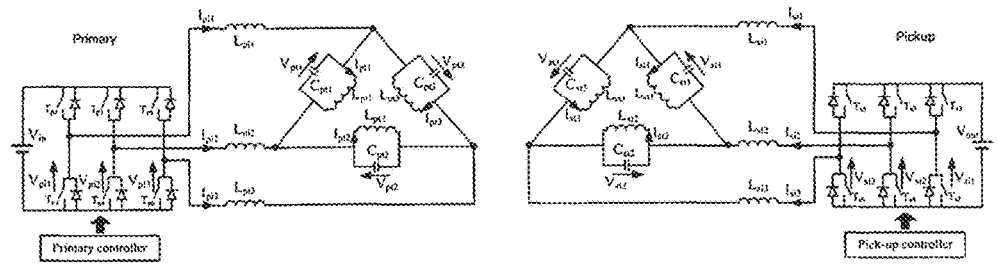
FIG. 6(a) shows another topology of a three-phase bi-directional IPT system as an example.
Figure 6B:
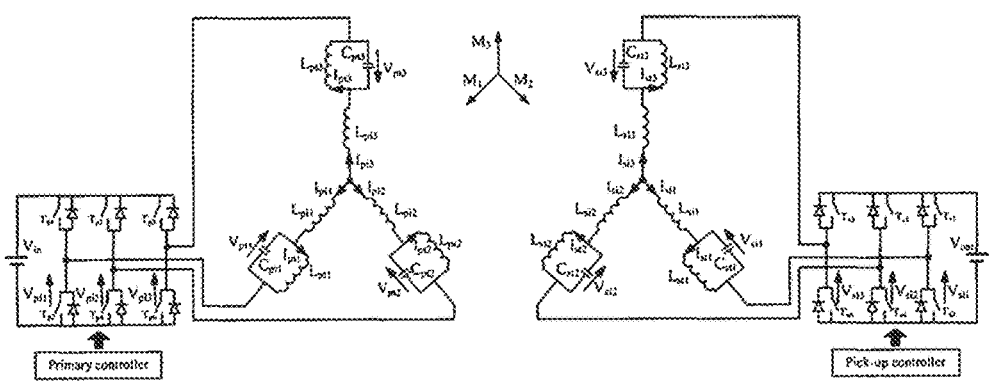
FIG. 6(b) shows a variation of the topology of the three-phase bi-directional IPT system of FIG. 6(a)

As evident from FIG. 5, the balanced three-phase delta-connected LCL networks of both the primary and the pick-up are driven by three-phase converter comprising three switch pairs in the form of half-bridge legs. The inductors $L_{pt1}$, $L_{pt2}$ and $L_{pt3}$ in the primary LCL network are the three-phase primary windings, which are magnetically coupled to three-phase pick-up windings $L_{st1}$, $L_{st2}$ and $L_{st3}$. To simplify the analysis presented in the proceeding section, the magnetic couplings between $L_{pt1}$-$L_{st1}$, $L_{pt2}$-$L_{st2}$ and $L_{pt3}$-$L_{st3}$, which are denoted by $M_1$, $M_2$ and $M_3$, respectively, are assumed to be equal. The primary side AC inductors $L_{pi1}$, $L_{pi2}$ and $L_{pi3}$ and pick-up side AC inductors $L_{si1}$, $L_{si2}$ and $L_{si3}$ are chosen to match $L_{pt1}$, $L_{pt2}$ and $L_{pt3}$ and $L_{st1}$, $L_{st2}$ and $L_{st3}$, respectively. The track and the pick-up inductances are parallel compensated, at track frequency $f_t$, using capacitors $C_{pt1}$, $C_{pt2}$ and $C_{pt3}$ and $C_{st1}$, $C_{st2}$ and $C_{st3}$, respectively. The LCL networks of the primary and the pick-up can alternatively be connected in a star arrangement as shown in FIG. 6(b). However, it is advantageous to connect the LCL network as indicated in FIG. 6(a), where AC inductors $L_{pi1}$-$L_{pi3}$ and $L_{si1}$-$L_{si3}$ are shared between adjacent phases. In this arrangement, two AC inductors are connected across each phase, and hence the AC inductance per phase only needs to be one-half the value of corresponding track/pick-up inductance.

The three-phase primary winding, usually referred to as primary conductive path or track may either be an elongate conductor arrangement, or can be a lumped system. In the form of an elongate arrangement, the conductor (typically comprising $L_{pt}$) may be provided on or alongside a rail or similar path, or be provided on or under a floor surface for example. In such an arrangement pick-ups may move along the rail or floor surface while receiving power from the primary. If a lumped system is used, then the primary path can be provided in the form of one or more charging pads for example. Typically a charging pad will be provided at a single location, or a series of locations, at which a pick-up may receive power. In the example discussed herein in which a three-phase system is employed, a three-phase track or charging pad (comprising three primary coils) is provided, and the arrangement may accommodate charging of moving vehicles.

The terms "conductor" and "conductor means" as used throughout the description and claims are intended to encompass all potential physical forms of the primary and/or pick-up conductors which provide or receive a magnetic field for magnetic or inductive coupling, whether they be an "elongate conductor" or "track"; or a "lumped system", "coil", "inductor", "pad"; or any of the other various terms commonly used in the field to describe such conductors or couplers.

The primary and the pick-up three-phase converters of this particular three-phase IPT system are controlled by two independent control subsystems. In one embodiment each leg of the three-phase converter is operated with a 50% duty cycle at the track frequency ($f_t$), but with a phase-shift in a manner that $V_{pi2}$ lags $V_{pi1}$ by 120° and $V_{pi3}$ leads $V_{pi1}$ by 120°.

The proposed three-phase system can be controlled in a number of ways. The output power/voltage/current of this system can be regulated by controlling either magnitude of voltages or the relative phase angles between the primary and the pick-up three-phase converters. In this example, the phase of $V_{si1}$, $V_{si2}$ and $V_{si3}$ is controlled with respect to the phase of $V_{pi1}$, $V_{pi2}$ and $V_{pi3}$ respectively, while maintaining the magnitudes constant, to regulate the output power/voltage/current of the pick-up unit, as described in WO 2010/062198. The same control can also be achieved by controlling relative phase angles between $I_{pt1}$, (or $I_{pt2}$ or $I_{pt3}$) and $I_{st1}$ (or $I_{st2}$ or $I_{st3}$), $I_{pt1}$ (or $I_{pt2}$ or $I_{pt3}$) and $V_{si1}$ (or $V_{si2}$ or $V_{si3}$) etc., which are essentially linked to the phase angle difference between $V_{pi1}$ (or $V_{pi2}$ or $V_{pi3}$) and $V_{si1}$ (or $V_{si2}$ or $V_{si3}$). An alternative control method is to fix the phase between $V_{pi1}$ and $V_{si1}$ at ±90 degrees, giving unity power factor, and control the magnitudes of either/both $V_{pi1}$-$V_{pi3}$ or/and $V_{si1}$-$V_{si3}$ to regulate power/voltage/current. Yet another alternative is to control both the relative phase and magnitudes of $V_{pi1}$-$V_{pi3}$ and $V_{si1}$-$V_{si3}$.

There are many well-known techniques that can be used for voltage regulation. The example presented here uses a simple PWM scheme to vary the magnitudes of $V_{pi1}$-$V_{pi3}$ and $V_{si1}$-$V_{si3}$ to regulate currents $I_{pt1}$-$I_{pt3}$ and $I_{st1}$-$I_{st3}$, and thus the output power/voltage/current. As illustrated in FIG. 7(b) the maximum line to line voltage is achieved when all three-phases of the three-phase converter are operated at a 50% duty cycle and a 120 degree phase shift between the phases. The line to line voltage can be reduced by introducing notches and pulses in these signals as illustrated by FIG. 7(c).

To control the phase of $V_{si1}$ (or $V_{si2}$ or $V_{si3}$) relative to $V_{pi1}$ (or $V_{pi2}$ or $V_{pi3}$), a sensing means or synchronisation mechanism is required in the pick-up. This can be achieved through various methods, some of which are outlined below, 1. Sensing the magnetic field produced by the primary windings using one or more sense windings. In practice part of the magnetic flux produced by the pick-up itself may affect this measurement. Thus an active or passive decoupling mechanism is used to obtain the primary flux vectors. It is necessary to identify the alignment of three phases in the pick-up with the primary windings. This can be achieved during the initialization process by monitoring the pick-up voltages;
2. Estimating primary converter phase angle through the reflected or induced voltage;
3. Estimating primary converter phase angle through the short-circuit current; or
4. Adopting a frequency droop technique that will control the operating frequency of the pick-up according to a set active and reactive power requirement.

Alternatively, the phase angle of the primary may be communicated to the pick-up by any known wired or wireless communication means.

Figure 7A:
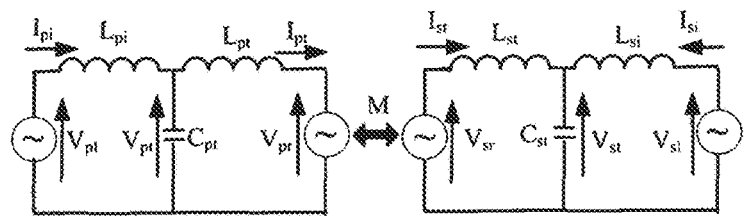
FIG. 7(a) shows a single-phase equivalent circuit for purposes of analysis of the circuit topology of FIG. 4(a)
Figure 7B:
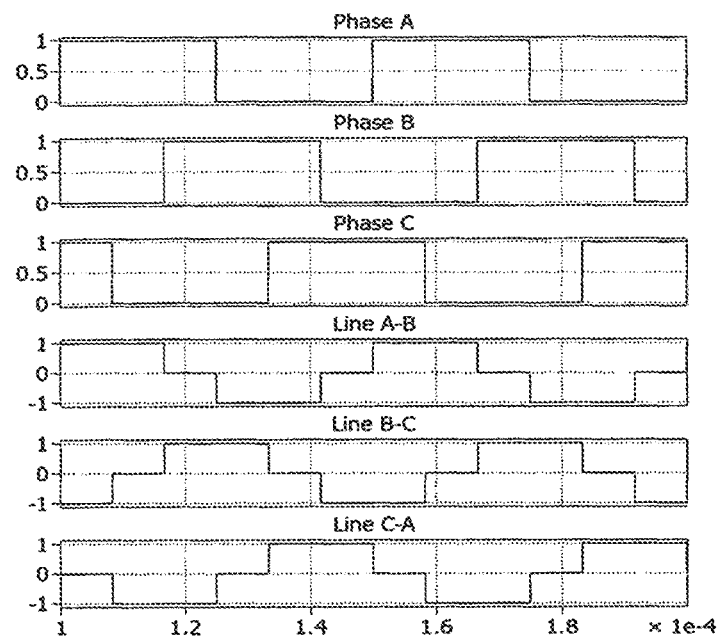
FIG. 7(b) shows voltages with respect to time of the individual phases and the line to line voltages between phases, illustrating a pulse width modulation (PWM) control scheme suitable for use with the present invention.
Figure 7C:
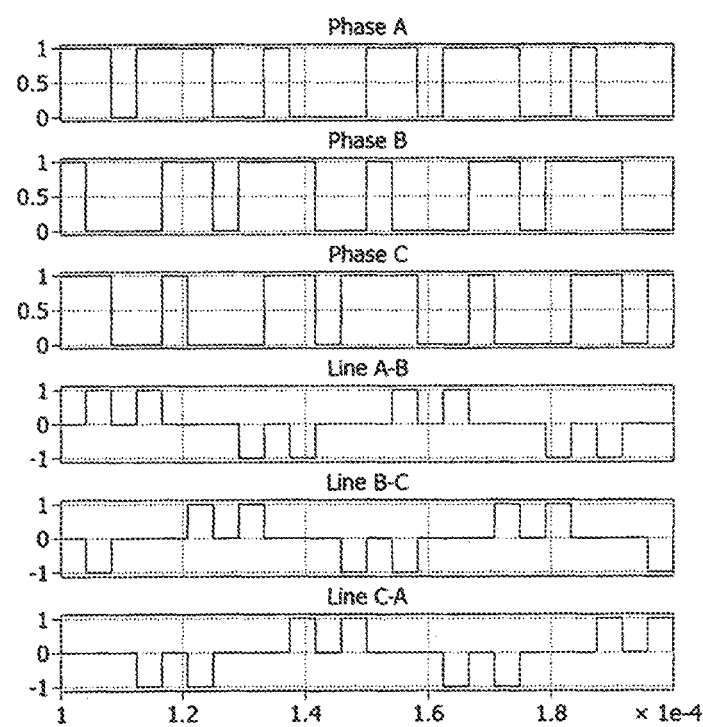
FIG. 7(c) shows a reduction in the line to line voltages by introducing notches and pulses.
Figure 7D:
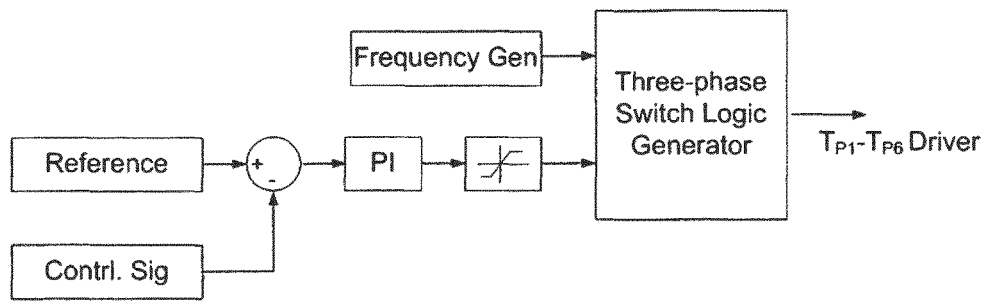
FIG. 7(d) shows one example of a schematic for a control structure for the primary switches.
Figure 7E:
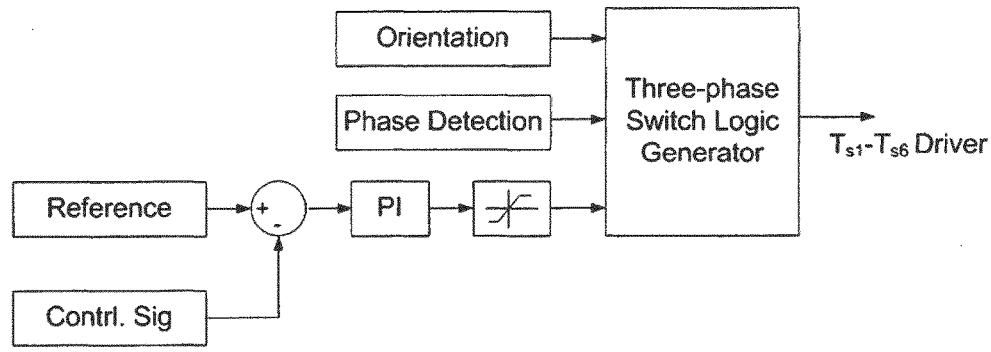
FIG. 7(e) shows one example of the control structure for use in a pick-up.

A possible control structure that can be used to control the primary is illustrated in FIG. 7(d) and a controller that can be used in the pick-up is shown in FIG. 7(e). As illustrated in FIG. 7(c), the pulse width of the voltage produced by the converter legs can be modulated in order to vary the voltage applied to the primary windings and, thereby, regulate the track currents in each of the primary windings. The error between the required (i.e. "reference" input to the primary controller of FIG. 7(d)) and actual (i.e. the "contrl. sig" input) track currents is fed through a controller, for example a proportional-integral (PI) controller as shown, and the output of the controller is used to determine the modulation that needs to be applied to each leg of the primary converter. Similarly, the pick-up controller of FIG. 7(e) regulates the output power by passing the error between a reference power level and the measured power level through a PI controller and then determining the pulse width modulation and phase delay (with respect to the corresponding primary converter leg) to be applied to the legs of the pick-up converter.

The primary and pick-up controllers may be implemented by electronic hardware, software, or a combination thereof as will be apparent to persons skilled in the arts of electronic and embedded systems engineering, and in particular control systems. For example, the control algorithms described herein and illustrated in FIGS. 7(d) and 7(e) may be implemented, in whole or in part, by a microprocessor or similar computing device programmed to perform the steps of the method as described. Once programmed to perform particular functions pursuant to instructions from program software that implements the method of this invention, such digital computer systems in effect become special-purpose computers particular to the method of this invention. The programming techniques necessary for this are well-known to those skilled in the art of computer and/or embedded systems.

The proposed three-phase IPT system of with balanced LCL networks can be simplified by representing this system with a single-phase equivalent circuit shown in FIG. 7(a). Furthermore, the analysis presented below assumes that both the primary and the pick-up circuits are driven by ideal sinusoidal voltage sources ($V_{p1}$ and $V_{s1}$) with approximate magnitudes of:

$$|V_{pl}| \approx \frac{2\sqrt{3}}{\pi} V_{in} \quad (1)$$

$$|V_{sl}| \approx \frac{2\sqrt{3}}{\pi} V_{out} \quad (2)$$

The component values of the equivalent circuit, for this particular embodiment (other embodiments may have different component values), are given by:

$$L_{pt1} = L_{pt2} = L_{pt3} = L_{pt} \quad (3)$$

$$L_{pi1} = L_{pi2} = L_{pi3} = L_{pi} = L_{pi} \quad (4)$$

$$L_{st1} = L_{st2} = L_{st3} = L_{st} \quad (5)$$

$$L_{si1} = L_{si2} = L_{si3} = L_{si} = L_{si} \quad (6)$$

$$M_1 = M_2 = M_3 = M \quad (7)$$

The LCL circuits in the primary and the pick-up are both tuned to the track frequency ($f_t$) and therefore (when fully compensated):

$$\omega^2 = (2\pi f_t)^2 = \frac{1}{L_{pt}C_{pt}} = \frac{1}{L_{pi}C_{pt}} = \frac{1}{L_{st}C_{st}} = \frac{1}{L_{si}C_{st}} \quad (8)$$

The current flowing in the track inductor $L_{pt}$ is then given by:

$$I_{pt} = -j\frac{V_{pl}}{\omega L_{pt}} \quad (9)$$

Due to magnetic coupling that exists between the track and the pick-up, a voltage is induced in the pick-up inductor by $I_{pt}$, which can be expressed as:

$$V_{sr} = j\omega M I_{pt} \quad (10)$$

The output current of the pick-up is given by:

$$I_{si} = \frac{M I_{pt}}{L_{si}} = -j\frac{M}{L_{si}}\frac{V_{pl}}{\omega L_{st}} \quad (11)$$

The output power of the pick-up can be calculated from (1), (2) and (11):

$$P_o = -\frac{M}{\omega L_{st} L_{si}} \frac{18}{\pi^2} V_{out} V_{in} \sin(\theta) \quad (12)$$

where θ is the phase of $V_{si}$ with respect to $V_{pi}$.

From Equation (12) it is evident that maximum power transfer takes place when the phase angle θ is ±90°. A leading phase angle constitutes power transfer from the pick-up to the track while a lagging phase angle enables power transfer from the track to the pick-up. Therefore, for a given input and output voltage, both the amount and direction of power flow between the track and the pick-up can be regulated by controlling either the magnitude or phase angle of the voltage generated by the three-phase converters.

Simulation Results—Steady State Operation

A 5 kW three-phase IPT system as shown in FIG. 5, which is suitable for charging electric vehicles, has been simulated in MATLAB Simulink™, and the results are presented below. The primary side of the system is powered by a 330 V source and the pick-up is connected to a 250 V battery representing the EV. The design parameters of the system are given in the Table I, below.

Figure 8:
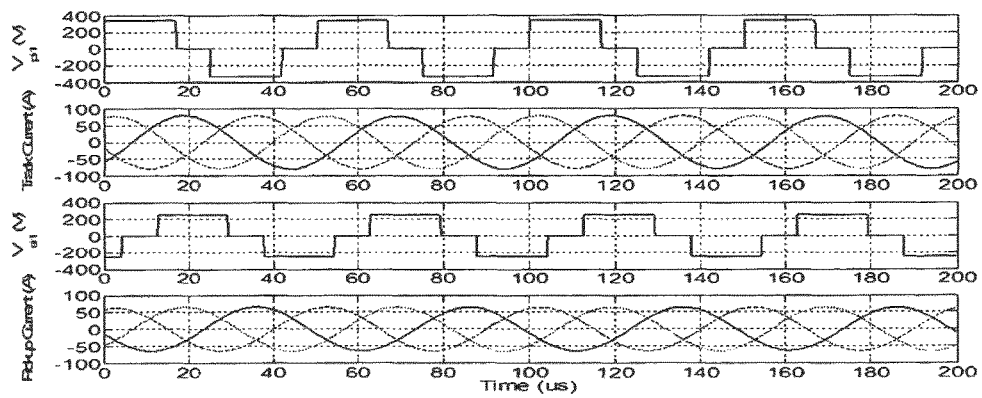
FIGS. 8 and 9 show plots of primary and pick-up line voltages and primary track currents for the topology of FIG. 4(a) when delivering 5 kW to the output.
Figure 9:
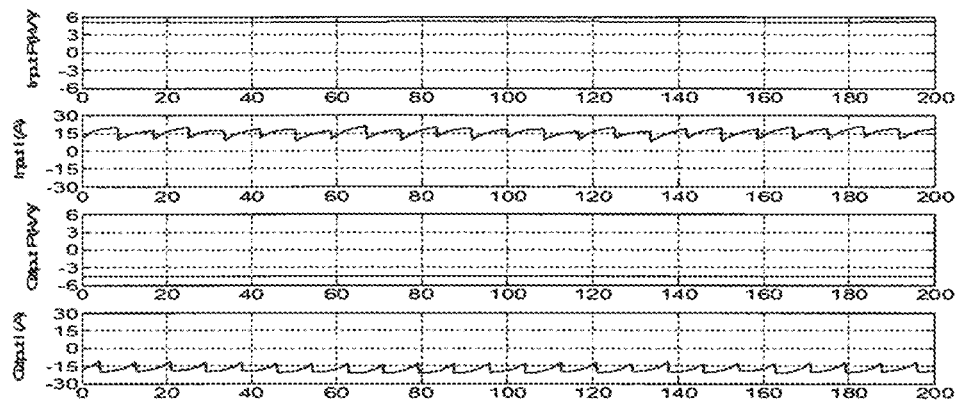

Simulated voltages and currents of both the primary and the pick-up of the proposed IPT system are shown in FIG. 8. Three half-bridges in the primary converter are operated at a 50% duty cycle and with a 120° phase shift between them to produce 20 kHz, 50 A balanced three-phase currents in primary track inductors $L_{pt1}$-$L_{pt3}$. Only one of the three primary line-line voltages ($V_{pl1}$=$V_{pi1}$-$V_{pi2}$), which is regarded as 'phase A', is shown in FIG. 8. As evident from the figure, the resulting maximum line-line voltage, $V_{pl1}$, is reduced by a factor of √3/2 due to the 30° overlap between voltages generated by the three half-bridges of the three-phase converter. The line voltages $V_{pl2}$ and $V_{pl3}$ are identical to $V_{pl1}$ but are shifted correspondingly in phase with respect to $V_{pl1}$ by 120° and 240°. The pick-up three-phase converter is also driven in a similar manner but with a 90° phase shift with respect to the corresponding phases of the primary. Thus the resulting currents in the pick-up inductors $L_{st1}$-$L_{st3}$ are lagging the corresponding primary track currents by 90°. Under these conditions and according to Equation (12), the IPT system delivers 5 kW to the output load. The primary track current, given by Equation (9), and the pick-up track current are both independent of the loading and are fixed by the circuit parameters. However in practice the track currents will reduce as the load increases due to losses and component tolerances. Therefore the line-line voltages need to be regulated in order to maintain a constant track current. The input and output currents of this system when delivering 5 kW to the output are illustrated in FIG. 9. As evident from the illustration, both the input and output ripple currents produced by the proposed three-phase IPT system are relatively small, and the peak currents are minimised as the tracks are each driven out of phase. Furthermore, it can be observed that the frequency of the ripple current is three times the track frequency. This is one of the main advantages of the proposed three-phase system, as it improves the system efficiency while eliminating the need for ripple filtering.

TABLE I

Single and Three-Phase IPT Systems Parameters

| Parameter | Single-Phase | Three- |
|---|---|---|
| $V_{in}$ | 330 V | 330 V |
| $V_{out}$ | 250 V | 250 V |
| Coupling (k) | 0.15 | 0.15 |
| $L_{pi}/L_{pi1} = L_{pi2} = L_{pi3}$ | 18 μH | 40 μH |
| $L_{pt}/L_{pt1} = L_{pt2} = L_{pt3}$ | 18 μH | 40 μH |
| $C_{pt}/C_{pt1} = C_{pt2} = C_{pt3}$ | 3.5 μF | 1.6 μF |
| $L_{si}/L_{si1} = L_{si2} = L_{si3}$ | 18 μH | 40 μH |
| $L_{st}/L_{st1} = L_{st2} = L_{st3}$ | 18 μH | 40 μH |
| $C_{st}/C_{st1} = C_{st2} = C_{st3}$ | 3.5 μF | 1.6 μF |

Figure 10:
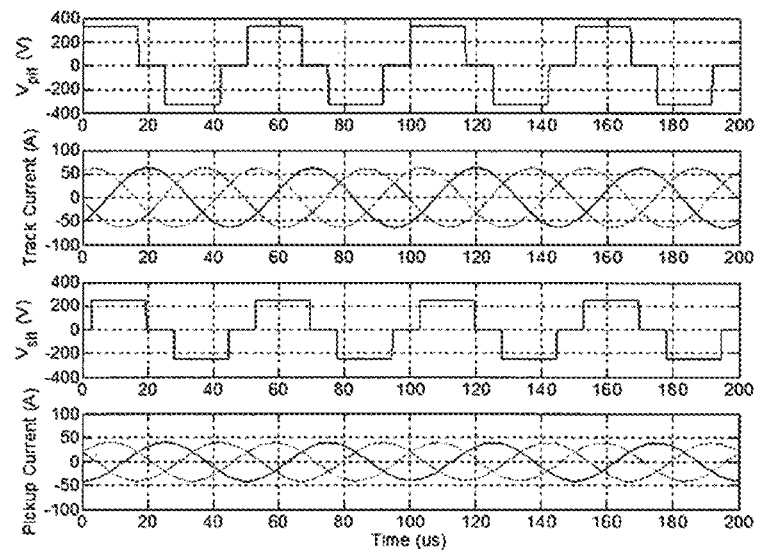
FIGS. 10 and 11 show plots of primary and pick-up line voltages and track currents for the three-phase topology of FIG. 4(a) when the phase difference between the primary and secondary coil currents is reduced.
Figure 11:
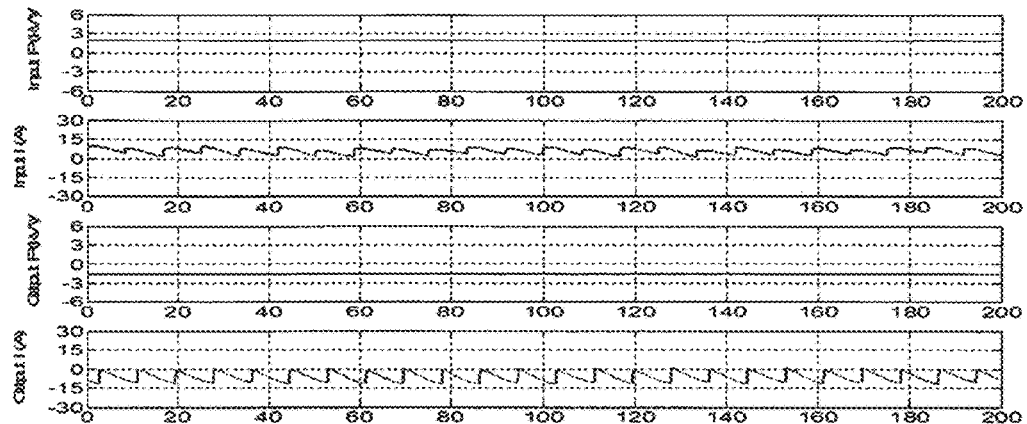

According to Equation (12), the power throughput of the converter can be regulated either by changing the relative phase angles between the primary and the pick-up side three-phase converters or by varying the line-line voltages. The output power of the IPT system in this example is regulated by controlling the phase angle between the primary and pick-up three-phase converters. The power throughput of the pick-up can be reduced by reducing the phase difference, θ between the two three-phase converters. The voltages and currents of the system when θ is reduced to 30° are shown in FIGS. 10 11. As evident from FIG. 11, the output power of the system has been reduced to about 2.5 kW in accordance with Equation (12). The reduced average input and output currents also reflect the reduction in the power throughput of the system. However, as evident from FIG. 10, the primary and pick-up track currents remain essentially constant but phase lag between the corresponding primary and pick-up currents is reduced from 90 to 30°.

The direction of the power flow between primary and the pick-up can be reversed by driving the pick-up side three-phase converter with a lagging phase angle. The pick-up of the three-phase IPT system was driven at a 90° lagging phase angle with respect to the primary side three-phase converter and the simulation results are shown in FIG. 12 and FIG. 13. As evident from FIG. 13 the pick-up is now delivering about 5 kW to the primary of IPT system. As a result, in comparison with FIG. 8, the direction of the current flow has now reversed.

The primary and pick-up voltages of a prior art single-phase system when it is delivering 5 kW to the load are shown in FIG. 14 and FIG. 15. As evident from FIG. 14, in comparison with the three-phase system, the primary and pick-up track currents of the single-phase system are significantly higher. The coupling between the primary and the pick-up of both the three-phase and the single-phase systems are equal. However, the three-phase system employs three primary tracks that are coupled to three pick-up inductor coils, and therefore requires significantly less track current to transfer 5 kW in comparison with the single-phase system. Furthermore, as illustrated in FIG. 15, the input and output ripple currents of the single-phase system are significantly higher at about twice the ripple current generated by the three-phase system.

A comparison between the three-phase and the single-phase systems are provided in Table II below, when both units are supplying 5 kW to the output. As evident from this comparison, both the input/output ripple currents and track currents of the three-phase system are significantly less thereby confirming the advantages of the three-phase to three-phase embodiment of the present invention. It can also be seen that both systems utilize approximately equal amounts of ferrites since the magnetic energy ($Li^2$) of both systems are similar. In addition, total compensation capacitances used by both single-phase and three-phase systems are approximately the same.

TABLE II

A Comparision between Single and Three-phase IPT Systems

| Parameter | Single-Phase | Three-Phase |
|---|---|---|
| Efficiency | 81% | 85% |
| Switches | 8 | 12 |
| Compensation Capacitance | 7 μF | 9.6 μF |
| Primary Input Ripple Current | 34 A to −28 A | 6 A to 16 A |
| Pick-up Output Ripple Current | 20 A to −40 A | −15 A to −21 A |
| Primary AC Inductor $Li^2$ | 21 mJ | 18 mJ |
| Pick-up AC Inductor $Li^2$ | 41 mJ | 41 mJ |
| Primary Track Current | 150 Arms | 57 Arms |
| Pick-up Track Current | 110 Arms | 43 (a)rms |
| Primary Track $Li^2$ | 720 mJ | 780 mJ |
| Pick-up Track $Li^2$ | 390 mJ | 444 mJ |

From the foregoing it will be seen that the invention provides several polyphase bi-directional IPT systems and converters which offer several advantages over the prior art. In at least some embodiments, the invention provides a poly-phase IPT power supply with independent control of each winding and capable of supplying power to multiple single-coil pick-ups (or vice versa) with improved efficiency by individually energising each primary conductor only when a load requires charging, without the need for a dedicated full-bridge inverter for each primary conductor. In other embodiments, the invention provides a poly-phase IPT system and polyphase primary and secondary converters which are particularly suitable for high power applications that require wireless power transfer, while also having independent control of each winding without a full-bridge inverter. The polyphase IPT system employs a polyphase circuit topology for both the primary and the pick-ups, and is capable of transferring power through loose magnetic coupling in both directions, and minimising peak currents. Results suggest that the proposed polyphase IPT system is superior in performance to existing IPT systems, and is ideal for high-power applications such as EVs which require rapid charging.

The terms "power source" and "load" are used throughout the description and claims with reference to uni-directional power flow from the primary to the output of the pick-up(s) for convenience. However, as the systems can be easily adapted for bi-directional power flow enabling power to flow in the either direction, the "load" may in that case comprise a power source and the "power source" may sink power from one or more of the pick-ups. The "power source" and "load" may therefore both be generally described as a power source/sink in the context of a bi-directional IPT system. However, the term "power source/ sink" is not to be construed as limiting to a bi-directional IPT system. That is, the "power source/sink" may be either or both of a power source or a power sink, but not necessarily both.

The term "IPT converter" as used in the claims refers to either of the primary IPT power supply/converter or a secondary/pick-up converter. An IPT converter may thus be inductively coupled with another IPT device which will generally be the other of the power supply or pick-up converter.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. A polyphase inductive power transfer (IPT) primary power supply comprising:
   a plurality of primary conductors, the primary conductors being individually selectively operable to control an alternating current in each of the primary conductors to provide or receive a magnetic field for inductive power transfer to control power transfer between the primary power supply and
   at least one pick-up comprising one or more pick-up conductors, the one or more pick-up conductors each being individually selectively operable to magnetically couple with a primary conductor of the primary power supply to control power transfer between the primary power supply and a load coupled with the respective pick-up.

2. The polyphase IPT primary power supply of claim 1 wherein any one or more of the plurality of primary conductors are selectively operable to provide a magnetic field as required.

3. The polyphase IPT primary power supply of claim 1, wherein each of the plurality of primary conductors is operated only when a load is to be powered by a pick-up magnetically coupled with the respective primary conductor.

4. The polyphase IPT primary power supply of claim 3, wherein the primary conductors are each operated out of phase by 360°/n, where n is the number of operating primary conductors.

5. The polyphase IPT primary power supply of claim 1, wherein the primary conductors are each operated out of phase by 360°/n, where n is the number of primary conductors.

6. The polyphase IPT primary power supply of claim 1, wherein each of the primary conductors are individually selectively coupled to a power source to control the alternating current in the respective primary conductor.

7. The polyphase IPT primary power supply of claim 1, wherein the primary power supply further comprises a plurality of switch pairs each selectively coupling a power source to at least one primary conductor whereby each primary conductor is coupled to the power source by a pair of switch pairs, and the switch pairs are independently controlled to control the alternating current in each of the primary conductors.

8. The polyphase IPT primary power supply of claim 7, wherein the alternating current in each of the primary conductors is controlled by controlling the phase angle between the respective pair of switch pairs coupled therewith.

9. The polyphase IPT primary power supply of claim 1, wherein the primary power supply is bi-directional and power may be selectively transferred from the primary power supply to the at least one pick-up or vice versa.

10. The polyphase IPT primary power supply of claim 1, wherein power transfer between the primary power supply and a respective pick-up is controlled by controlling the phase angle of an alternating current in the pick-up conductor with respect to the alternating current in the respective primary conductor.

11. The polyphase IPT primary power supply of claim 1, wherein the phase angle between respective alternating currents in the primary and pick-up conductors is regulated at ±90° and power transfer between the power source and the load is controlled by controlling the magnitude of the alternating currents in the primary or pick-up conductors.

12. The polyphase IPT primary power supply of claim 1 wherein one of the at least one pick-up comprises a plurality of pick-up conductors each magnetically coupled with one of the plurality of primary conductors to receive polyphase power from the primary power supply.

13. The polyphase IPT primary power supply of claim 12, wherein the pick-up further comprises a plurality of switch pairs each selectively coupling a load to at least one pick-up conductor whereby each pick-up conductor is coupled to the load by a pair of switch pairs, and the switch pairs are independently controlled to control power transfer between each of the pick-up conductors and the load.

14. The polyphase IPT primary power supply of claim 13, wherein the power transfer between each of the pick-up conductors and the load is controlled by controlling the phase angle between the respective pair of switch pairs coupled therewith.

15. The polyphase IPT primary power supply of claim 12, wherein the pick-up comprises a plurality of pick-up conductors equal in number to the plurality of primary conductors.

16. The polyphase IPT primary power supply of claim 1 wherein the at least one pick-up comprises one or more pick-ups each comprising a single pick-up conductor magnetically coupled with any one of the plurality of primary conductors.

17. The polyphase IPT primary power supply of claim 1, wherein the primary power supply automatically adapts to inductively power:
   one or more pick-ups each comprising a plurality of pick-up conductors; or
   one or more pick-ups each comprising a single pick-up conductor.

18. A polyphase inductive power transfer (IPT) system comprising:
- a primary power supply comprising a plurality of primary conductors, the primary conductors being individually selectively operable to control an alternating current in each of the primary conductors to provide or receive a magnetic field for inductive power transfer; and
- at least one pick-up comprising one or more pick-up conductors, the one or more pick-up conductors each being individually selectively operable to magnetically couple with a primary conductor to control power transfer between the primary power supply and a load configured to be coupled with the respective pick-up.

19. The IPT system of claim 18 wherein the conductors are each operated out of phase by 360°/n, where n is the number of conductors.

20. An inductive power transfer (IPT) power supply comprising a plurality of primary conductors, the primary conductors being individually selectively operable to provide or receive a magnetic field for inductive power transfer, wherein the power supply automatically adapts to supply power inductively to a single pick-up comprising a plurality of pick-up conductors, each being individually selectively operable to magnetically couple with a primary conductor, and one or more pick-ups each comprising a single pick-up conductor.

21. A polyphase inductive power transfer (IPT) pick-up comprising:
- one or more pick-up conductors, the one or more pick-up conductors each being individually selectively operable to magnetically couple with a primary conductor of a primary power supply comprising a plurality of primary conductors to control power transfer between the primary power supply and a load configured to be coupled with the respective pick-up, the primary conductors being individually selectively operable to control an alternating current in each of the primary conductors to provide or receive a magnetic field for inductive power transfer.

* * * * *